Sept. 26, 1933.    F. STALZER ET AL    1,927,960
VEHICLE CONTROL
Filed Oct. 28, 1931
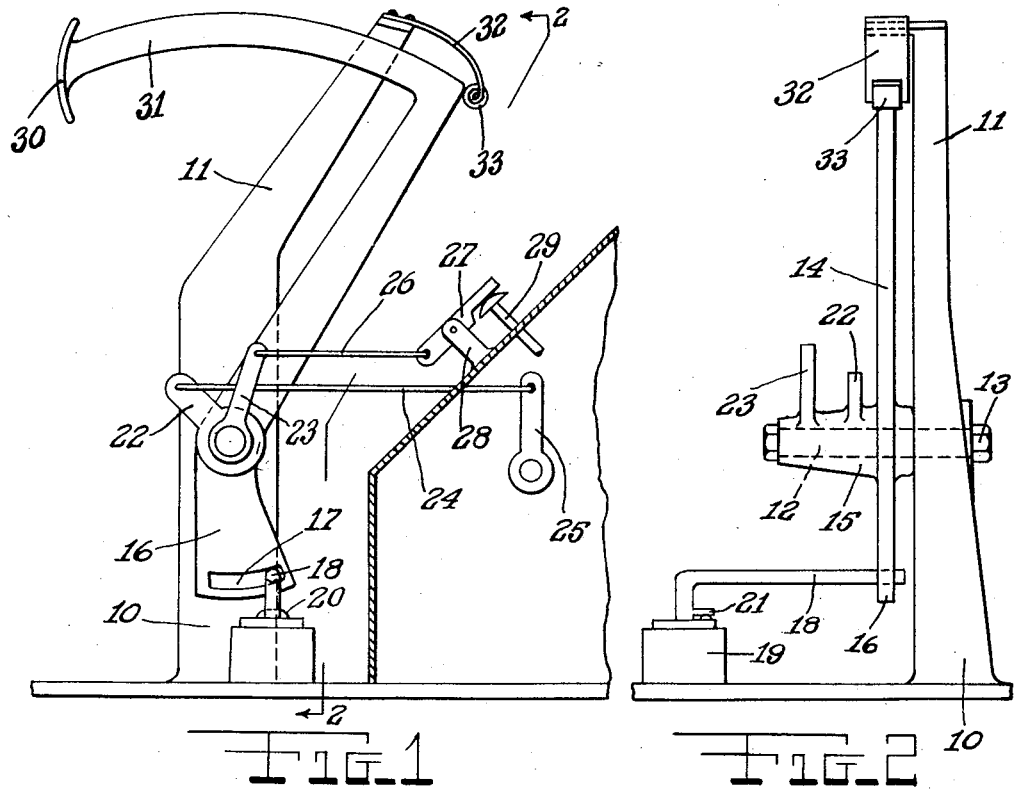
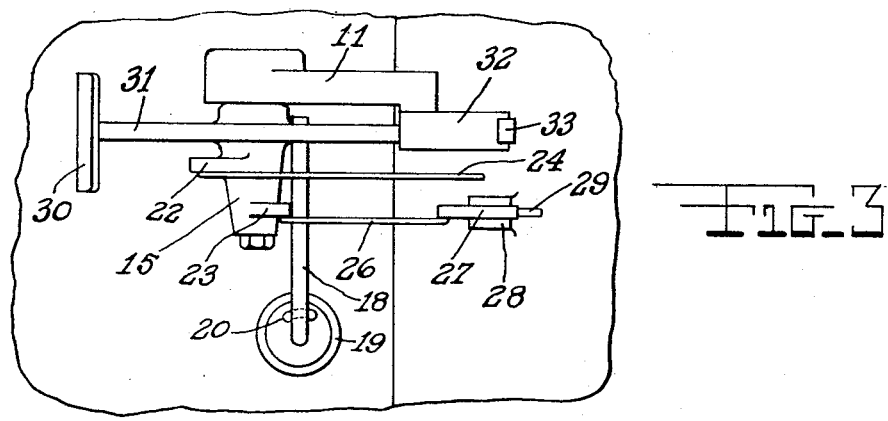
INVENTORS
*F. Stalzer*
*V. Koenig*
BY THEIR ATTORNEY Patented Sept. 26, 1933

1,927,960

UNITED STATES PATENT OFFICE 1,927,960

VEHICLE CONTROL

Franz Stalzer and Victor Koenig, Brooklyn, N. Y.

Application October 28, 1931. Serial No. 571,642

3 Claims. (Cl. 192—.01)

The main object of this invention is to provide a coordinate control device whereby the starter switch, clutch pedal, brake pedal and fuel accelerator perform their proper functions in unison upon depression of the clutch pedal. This control device eliminates the various individual control members and places all these functions within the range of a single control pedal.

The above and other objects will become apparent in the description below in which characters of reference refer to like-named parts in the drawing.

Referring briefly to the drawing, Figure 1 is a front elevational view of the coordinated control operated from the clutch pedal of an engine.

Figure 2 is a cross sectional view taken on line 2—2 of Figure 1.

Figure 3 is a top plan view of Figure 1 showing the arrangement of the various control members.

Referring in detail to the drawing, the numeral 10 indicates an upright bracket which has an angularly extending arm 11 rising therefrom. The bracket serves as a support or mounting for a horizontal shaft 12 which is secured on the bracket by a nut 13. An operating clutch pedal 14 is formed integral with a hub 15. Said hub is freely rotatable on the shaft 12 upon which it is loosely mounted. A tongue 16 depends from the hub 15 and is provided with an arcuate slot 17. This slot receives the end of a reach bar 18 which is rotatably mounted in the ignition switch casing 19. The roof of the latter is provided with a contact lug 20 which is adapted to be engaged by a lip 21 mounted on the rotatable part of the reach bar 18 to close the circuit, not shown, thru the switch casing.

The hub of the control mechanism is provided with a pair of differently disposed crank arms 22 and 23 which are of a length to suit the purpose for which they are designed. The arm 22 is secured to the common brake lever 25 by a connecting rod 24. The other crank arm 23 is connected to a lever bar 27 by a connecting member 26. This lever bar 27 is pivoted intermediate its length and is mounted in raised position on a boss 28. The free end of member 27 rests upon the button of an accelerator rod 29. At the end of the clutch pedal bar 31 a curved foot plate 30 is located. At the intersection of members 14 and 31 a roller 33 is located in abutting position to the arm 14. This roller is journalled at the end of a resilient finger 32 which surmounts member 11 of the bracket.

The control device is adapted to release the clutch, release the brake, diminish the flow of fuel thru the carburetor and open the ignition switch. All of these functions are accomplished in unison by the operation of the clutch pedal 14. The latter in being moved forward engages the brakes, disengages the clutch, restores the accelerator 29 to idling position and opens the switch, thereby opening the ignition circuit of the motor.

It is to be noted that certain changes in form and construction may be made without departing from the spirit and scope of the invention.

I claim:

1. In a device for simultaneously operating a clutch pedal, a brake lever, an accelerator, and an ignition switch, an upright bracket, a shaft extending therefrom, a hub integral with said clutch pedal rotatably mounted on said shaft, an arm on said hub connected to the brake lever, a second arm on said hub, said second arm being connected to the accelerator, a resilient finger mounted on said bracket, a roller secured to said finger and adapted to ride on said clutch pedal, and means for mechanically opening and closing said switch.

2. In a device for simultaneously operating a clutch pedal, a brake lever, an accelerator, and a switch, an upright bracket, a shaft extending therefrom, a hub integral with said clutch pedal and rotatably mounted on said shaft, an arm on said hub connected to the brake lever, a second arm on said hub connected to the accelerator, a resilient finger having a roller mounted thereon, said finger being adapted to locate said pedal in a position of rest, a tongue depending from said hub and having a slot therein, an ignition switch casing, a reach bar actuating said switch, said bar being engaged in said slot, said slot permitting further movement of the clutch pedal after said switch has been operated.

3. In a device for simultaneously operating a clutch pedal, a brake lever, an accelerator, and a switch, an upright bracket having a shaft extending therefrom, a hub integral with said clutch pedal and rotatably mounted on said shaft, an arm on said hub connected to the brake lever, a second arm on said hub connected to the accelerator, a tongue depending from said hub and having an arcuate slot therein, an ignition switch casing having a contact thereon, an L-shaped reach bar rotatably mounted in said casing and having an arm loosely engaged in said slot, a contact rigid with said reach bar adapted to alternately engage and disengage said casing contact to close or open the ignition circuit, said reach bar being rotatable in said casing upon swinging of said tongue by engagement of said reach bar in said slot, said slot permitting further movement of the clutch pedal after said switch has been operated.

FRANZ STALZER.
VICTOR KOENIG.